(12) United States Patent
Shieh et al.

(10) Patent No.: US 9,373,162 B2
(45) Date of Patent: Jun. 21, 2016

(54) AUTO-CONTRAST ENHANCEMENT SYSTEM

(71) Applicants: NCKU RESEARCH AND DEVELOPMENT FOUNDATION, Tainan (TW); HIMAX TECHNOLOGIES LIMITED, Tainan (TW)

(72) Inventors: Ming-Der Shieh, Tainan (TW); Der-Wei Yang, Tainan (TW); Yun Chen Chang, Tainan (TW); Tzung-Ren Wang, Tainan (TW)

(73) Assignees: NCKU Research and Development Foundation, Tainan (TW); Himax Technologies Limited, Tainan (TW)

(*) Notice: Subject to any disclaimer, the term of this patent is extended or adjusted under 35 U.S.C. 154(b) by 75 days.

(21) Appl. No.: 14/512,349

(22) Filed: Oct. 10, 2014

(65) Prior Publication Data
US 2016/0104272 A1 Apr. 14, 2016

(51) Int. Cl.
G06K 9/00 (2006.01)
G06T 5/40 (2006.01)

(52) U.S. Cl.
CPC .......................................... *G06T 5/40* (2013.01)

(58) Field of Classification Search
None
See application file for complete search history.

(56) References Cited

U.S. PATENT DOCUMENTS

| | | | | |
|---|---|---|---|---|
| 2006/0221252 A1* | 10/2006 | Zhou | ....................... | H04N 17/00 348/700 |
| 2007/0206868 A1* | 9/2007 | Nakayama | ........... | H04N 19/176 382/232 |
| 2011/0019096 A1* | 1/2011 | Lee | ........................ | H04N 5/205 348/607 |
| 2011/0085697 A1* | 4/2011 | Clippard | .............. | G06K 9/4652 382/100 |
| 2014/0044373 A1* | 2/2014 | Yasutomi | .................. | G06T 5/00 382/254 |

OTHER PUBLICATIONS

Tsu-Cheng Jen et al., "Bayesian Structure-Preserving Image Contrast Enhancement and Its Simplification", IEEE Transactions on Circuits and Systems for Video Technology, vol. 22, No. 6, Jun. 2012, pp. 831-843.

Daniel J. Jobson et al., "Properties and Performance of a Center/Surround Retinex", IEEE Transactions on Image Processing, vol. 6, No. 3, Mar. 1997, pp. 451-462.

Daniel J. Jobson et al., "A Multiscale Retinex for Bridging the Gap Between Color Images and the Human Observation of Scenes", IEEE Transactions on Image Processing, vol. 6, No. 7, Jul. 1997, pp. 965-976.

Sabzali Aghagolzadeh et al., "Transform Image Enhancement", Optical Engineering, vol. 31, No. 3, Mar. 1992, pp. 614-626.

Jinshan Tang et al., "Image Enhancement Using a Contrast Measure in the Compressed Domain", IEEE Signal Processing Letters, vol. 10, No. 10, Oct. 2003, pp. 289-292.

(Continued)

*Primary Examiner* — Eueng-Nan Yeh
(74) *Attorney, Agent, or Firm* — Donald E. Stout; Stout, Uxa & Buyan, LLP

(57) ABSTRACT

An auto-contrast enhancement system includes a human visual system (HVS)-based local difference (LD) histogram unit configured to build a LD histogram with respect to intensity values; a histogram classifier configured to categorize histograms of input images based on distribution properties; and a histogram equalization (HE) unit configured to process the input image according to a result of the HVS-based LD histogram unit and the enhancement level determined in the histogram classifier.

13 Claims, 4 Drawing Sheets

(56) References Cited

OTHER PUBLICATIONS

Jayanta Mukherjee et al., "Enhancement of Color Images by Scaling the DCT Coefficients", IEEE Transactions on Image Processing, vol. 17, No. 10, Oct. 2008, pp. 1783-1794.

Karen A. Panetta et al., "Human Visual System-Based Image Enhancement and Logarithmic Contrast Measure", IEEE Transactions on Systems, Man, and Cybernetics, part B: Cybernetics, vol. 38, No. 1, Feb. 2008, pp. 174-188.

Anustup Choudhury et al., "Perceptually Motivated Automatic Color Contrast Enhancement", IEEE 12th International Conference on Computer Vision Workshops, ICCV Workshops, 2009, pp. 1893-1900. (published before this application Oct. 2014).

Tarik Arici et al. "A Histogram Modification Framework and Its Application for Image Contrast Enhancement", IEEE Transactions on Image Processing, vol. 18, No. 9, Sep. 2009, pp. 1921-1935.

Doo Hyun Choi, et al., "Color Image Enhancement Based on Single-Scale Retinex with a JND-Based Nonlinear Filter", IEEE International Symposium on Circuits and Systems, New Orleans, LA, May 2007, pp. 3948-3951.

Gang Song et al., "Adaptive Color Image Enhancement Based on Human Visual Properties", IEEE, 2008, pp. 1892-1895.

Chen Gao et al., "A New Color Contrast Enhancement Algorithm for Robotic Applications", IEEE, 2012, pp. 42-47. (published before this application Oct. 2014).

\* cited by examiner

| DS | SV | FV | BS |

AUTO-CONTRAST ENHANCEMENT SYSTEM

BACKGROUND OF THE INVENTION

1. Field of the Invention

The present invention generally relates to an auto-contrast enhancement system, and more particularly to a human visual system (HVS)-based auto-contrast enhancement system with side-effect suppression.

2. Description of Related Art

Image enhancement is widely applied to refine images with low contrast or images captured in non-ideal lighting conditions. Traditional contrast enhancement algorithms usually suffer from over-enhancement, which makes images look unnatural and amplifies noise.

Histogram enhancement (HE) is the most common method for improving contrast enhancement. With HE, the intensities of an image are distributed more uniformly to achieve better contrast. The overall complexity of HE-based algorithms is low compared to that of other methods. However, HE can easily induce over-enhancement, noise amplification, fine detail loss, or making the image look unnatural.

Moreover, human eyes cannot easily distinguish the intensity variation in a saturated region. The saturation region is generally regarded as a smooth region that contains no texture information. However, slight intensity variation and random distributed hue are frequently hidden inside the saturation region. If contrast enhancement is applied directly, noise amplification will be strong in this region.

Therefore, a proper enhancement level and side-effect reduction methods are crucial in a contrast enhancement system.

SUMMARY OF THE INVENTION

In view of the foregoing, it is an object of the embodiment of the present invention to provide an auto-contrast enhancement system, by which a content-dependent enhancement level is auto-decided according to the histogram distribution, which is built considering human visual sensitivity. The saturation enhancement compensates for possible saturation degradation after contrast enhancement and refines the image saturation locally without noisy hue amplification. Furthermore, the overall complexity in the algorithm is low to make it hardware realizable and suitable for real-time applications.

According to one embodiment, an auto-contrast enhancement system includes a human visual system (HVS)-based local difference (LD) histogram unit, a histogram classifier and a histogram equalization (HE) unit. The human visual system (HVS)-based local difference (LD) histogram unit receives an input pixel of an input image to build a LD histogram with respect to intensity values. The histogram classifier categorizes histograms of input images based on distribution properties, thereby deriving a plurality of classes. The histogram equalization (HE) unit processes the input image according to a result of the HVS-based LD histogram unit and the enhancement level determined in the histogram classifier.

DETAILED DESCRIPTION OF THE INVENTION

Figures 1, 2A:
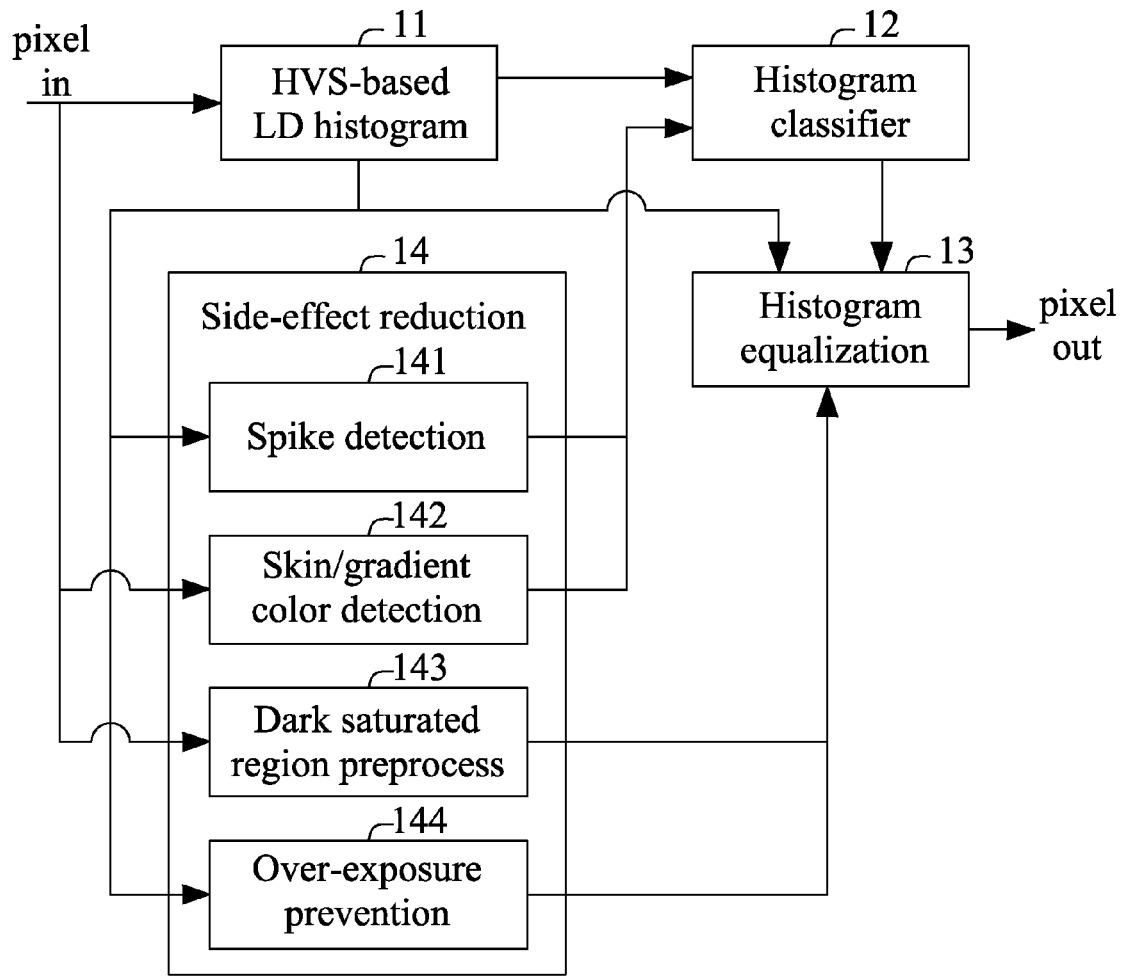
FIG. 1 shows a block diagram illustrated of an auto-contrast enhancement system according to one embodiment of the present invention.
FIG. 2A shows an intensity gradient partition according to human visual sensitivity.

FIG. 1 shows a block diagram illustrated of an auto-contrast enhancement system 100 according to one embodiment of the present invention. The auto-contrast enhancement system 100 may be performed by a processor, such as a digital image processor, be implemented by circuitry or their combination.

The auto-contrast enhancement system 100 includes a human visual system (HVS)-based local difference (LD) histogram unit 11 that is coupled to receive an input pixel of an input image. According to one aspect of the embodiment, a luminance component in hue-saturation-luminance (HSL) color space is selected as intensity, instead of hue-saturation-value (HSV) color space ordinarily used in conventional enhancement systems. As intensities have different characteristics, all intensity values (e.g., 0 to 255) are segmented in the embodiment into plural (e.g., four) regions according to human visual sensitivity: (a) dark saturation (DS) region, slow variation (SV) region, fast variation (FV) region, and bright saturation (BS) region as shown in FIG. 2A.

The HVS-based LD histogram unit 11 builds a local difference histogram considering the different characteristics of contrast sensitivity in each region to acquire adequate adjustment for various types of content. Specifically, when the intensity difference between neighboring pixels is larger than a predetermined threshold value, the intensity of a current pixel is accumulated into the local difference histogram. It is noted that the threshold values in the regions are different. Generally speaking, the threshold value in a region of lower intensity values is greater than the threshold value in a region of higher intensity values.

Figure 2B:
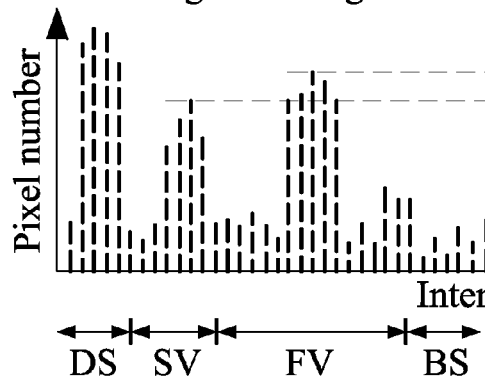
FIG. 2B to FIG. 2E show histograms at various stages processed by the HVS-based LD histogram unit of FIG. 1.
Figure 2C:
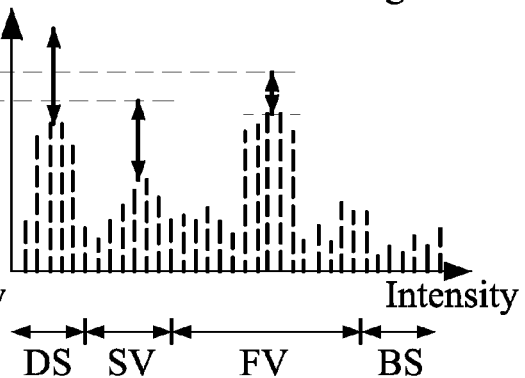
Figure 2D:
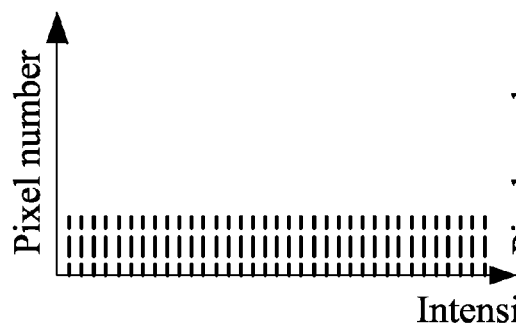
Figure 2E:
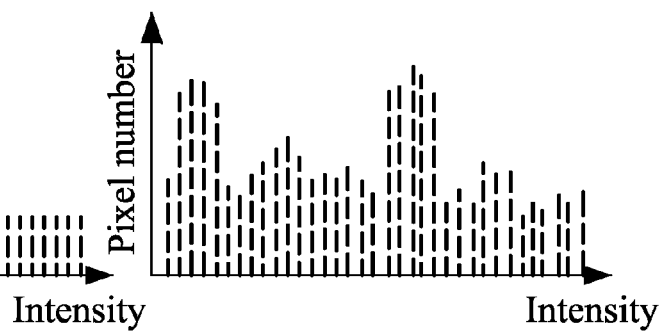

FIG. 2B shows an exemplary original histogram, which is processed by the HVS-based LD histogram unit 11 to generate a local difference histogram as shown in FIG. 2C. It is noted that the generated local difference histogram (FIG. 2C) suppresses the peaks in the original histogram (FIG. 2B) with different extents in different regions. Generally speaking, the peaks in a region of lower intensity values are suppressed with higher extent than the peaks in a region of higher intensity. The local difference histogram (FIG. 2C) is combined with a uniform histogram (FIG. 2D) to form a modified histogram as shown in FIG. 2E.

Figures 3A, 3B:
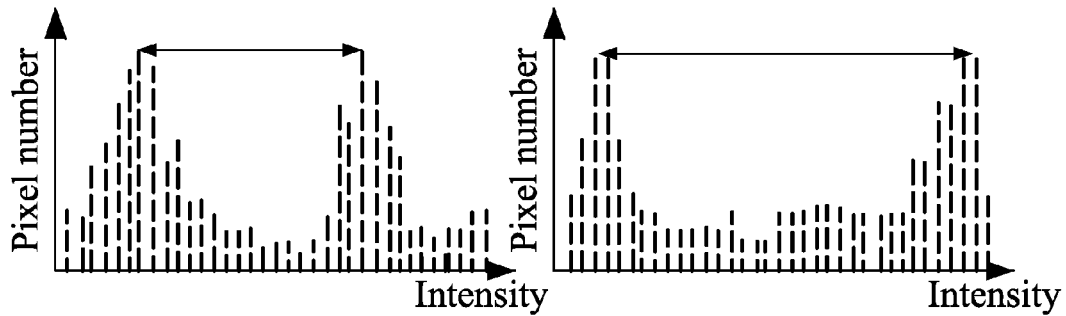
FIG. 3A to FIG. 3E shows exemplary histograms to be categorized by the histogram classifier of FIG. 1.
Figures 3C, 3D:
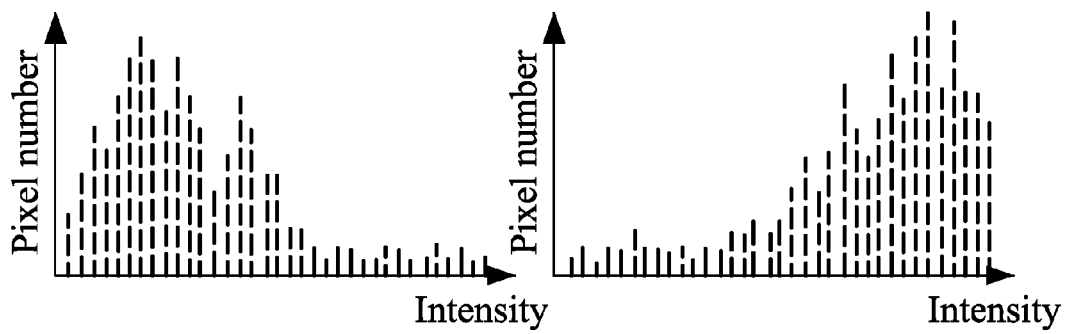
Figure 3E:
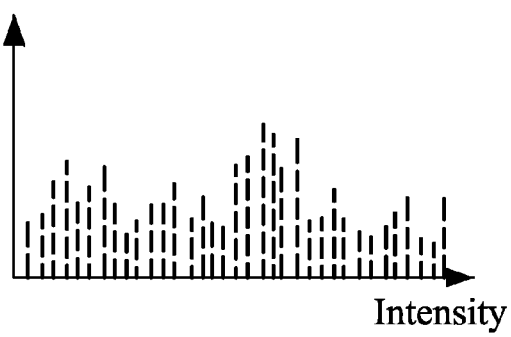

Referring to FIG. 1, the auto-contrast enhancement system 100 also includes a histogram classifier 12, which categorizes histograms of plural input images based on distribution properties. To each class, a specifically different enhancement level is accordingly determined. In one embodiment, at least three classes are derived. Regarding the first class as exemplified in FIG. 3A or FIG. 3B, the histogram comprises primarily a large amount of both high and low intensity values and substantially small amount of other intensity values. Generally speaking, the greater is the distance between the average of the high intensity values and the average of the low intensity values (e.g., FIG. 3A), the greater is the enhancement level thus determined. Regarding the second class as exemplified in FIG. 3C or FIG. 3D, the histogram comprises mostly dark (FIG. 3C) or bright (FIG. 3D) intensity values, respectively. Generally speaking, the closer is the average of the bright intensity values to the lowest intensity value or the closer is the average of the dark intensity values to the highest intensity value, the greater is the enhancement level. The histogram (e.g., FIG. 3E) other than those described above is categorized as the third class in the embodiment. An image of the third class requires no further enhancement.

Subsequently, the input image is processed by a histogram equalization (HE) unit 13 according to a result (e.g., a mapping curve of the input and the output intensities) of the HVS-based LD histogram unit 11 and the enhancement level determined in the histogram classifier 12. The HE unit 13 may be performed using one of conventional HE techniques, details of which are thus omitted for brevity.

Figure 4:
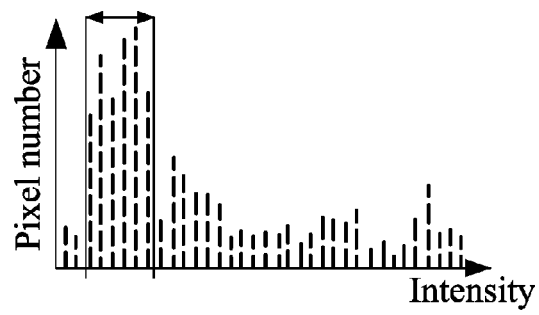
FIG. 4 shows an exemplary histogram with noise amplification in a smooth region.

According to another aspect of the embodiment, the auto-contrast enhancement system 100 includes a side-effect reduction unit 14 to reduce side-effects, such as over-enhancement or noise amplification, due to contrast enhancement. The side-effect reduction unit 14 of the embodiment includes a spike detection subunit 141, which is configured to identify a spike in a smooth region and accordingly to degrade noise amplification in the smooth region. FIG. 4 shows an exemplary histogram with noise amplification in a smooth region. According to a result of the spike detection subunit 141, the enhancement level is decreased dynamically according to the pixel number in the spike and the spike distribution range.

The side-effect reduction unit 14 of the embodiment also includes a skin and gradient color detection subunit 142, which is configured to detect skin and/or gradient color regions, and accordingly to constraint the enhancement level, thereby avoiding unexpected or unnatural skin/gradient color.

The side-effect reduction unit 14 of the embodiment also includes a dark saturated region preprocess subunit 143, which is configured to remove noise and color variation using local smooth preprocessing. In the specification, the saturation region is defined as an area with all extremely high- or low-intensity pixels, in which human eyes cannot easily distinguish the intensity variation. The saturated region must be chosen cautiously in order not to eliminate meaningful information.

Figure 5:
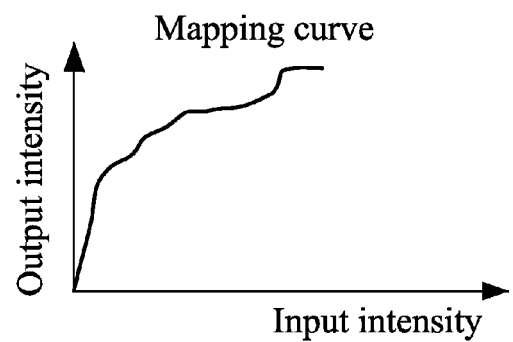
FIG. 5 shows an exemplary mapping curve for over-exposed regions.

The side-effect reduction unit 14 of the embodiment further includes an over-exposure prevention subunit 144, which is configured to eliminate over-exposure in a high-intensity region. FIG. 5 shows an exemplary mapping curve for over-exposed regions. To deal with this situation, a high-intensity threshold is determined adaptively according to the high-intensity distribution of the content. If the intensity is smaller than the threshold, HE is applied; otherwise, direct mapping from the input to the output intensities is used.

Figure 6A:
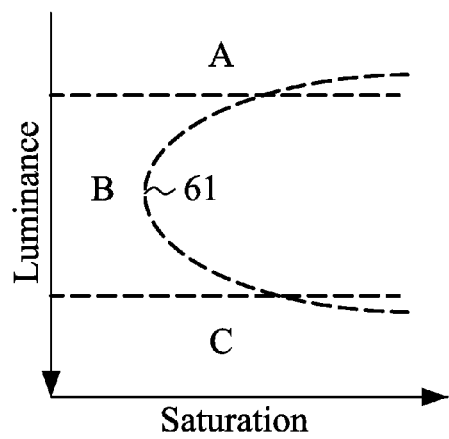
FIG. 6A shows a hue plane.
Figure 6B:
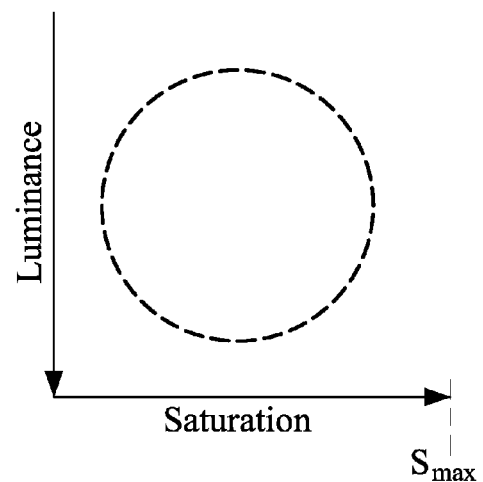
FIG. 6B shows a circular region in the hue plane of FIG. 6A for separating colorful and low-saturation regions.

According to a further aspect of the embodiment, saturation enhancement is further performed after contrast enhancement to compensate for the visual saturation drop that occurs when pixel luminance changes in the HSL color space. FIG. 6A shows a hue plane. The invisible hue information is in the low-intensity region (A), the low-saturation region (B), and the high-intensity region (C) lying to the left of a dashed parabolic curve 61 and between the low-intensity region (A) and the low-saturation region (B). If saturation enhancement is applied directly to these regions, the hue information may be amplified. In order to increase image saturation without noisy hue amplification, color and grayscale pixels are distinguished. Saturation enhancement is applied only to proper regions to avoid noisy hue amplification. In order to reduce computation complexity, a circular region as shown in FIG. 6B is applied to utilize distance-based saturation enhancement with lower computation complexity. The saturation enhancement level is then calculated with the reference of the distance from the location of saturation and luminance to the maximum saturation point $S_{max}$.

Although specific embodiments have been illustrated and described, it will be appreciated by those skilled in the art that various modifications may be made without departing from the scope of the present invention, which is intended to be limited solely by the appended claims.

What is claimed is:

1. An auto-contrast enhancement system, comprising a processor executing the following elements:
   a human visual system (HVS)-based local difference (LD) histogram unit coupled to receive an input pixel of an input image in order to build a LD histogram with respect to intensity values;
   a histogram classifier configured to categorize histograms of input images based on distribution properties, thereby deriving a plurality of classes; and
   a histogram equalization (HE) unit configured to process the input image according to a result of the HVS-based LD histogram unit and an enhancement level determined in the histogram classifier;
   wherein all the intensity values are segmented into a plurality of regions according to human visual sensitivity;
   in the HVS-based LD histogram unit, when an intensity difference between a current pixel and a preceding neighboring pixel of the input image is larger than a predetermined threshold value, the intensity value of the current pixel is accumulated into the LD histogram.

2. The system of claim 1, wherein a luminance component in hue-saturation-luminance (HSL) color space is selected as the intensity value.

3. The system of claim 1, wherein the predetermined threshold value in a region of lower intensity values is greater than the predetermined threshold value in a region of higher intensity values.

4. The system of claim 1, wherein the LD histogram is combined with a uniform histogram to form a modified histogram.

5. The system of claim 1, wherein one of the plurality of classes is directed to a histogram comprising primarily a large amount of both high and low intensity values and substantially small amount of other intensity values, wherein the greater is a distance between an average of the high intensity values and an average of the low intensity values, the greater is an enhancement level.

6. The system of claim 1, wherein one of the plurality of classes is directed to a histogram comprising mostly bright or dark intensity values, wherein the closer is an average of the bright intensity values to a lowest intensity value or the closer is an average of the dark intensity values to a highest intensity value, the greater is an enhancement level.

7. The system of claim 1, further comprising a side-effect reduction unit configured to reduce side-effects due to contrast enhancement.

8. The system of claim 7, wherein the side-effect reduction unit comprises a spike detection subunit configured to identify a spike in a substantially smooth region of the result of the HVS-based LD histogram unit and accordingly to degrade noise amplification in the smooth region.

9. The system of claim 7, wherein the side-effect reduction unit comprises a skin and gradient color detection subunit configured to detect skin and/or gradient color regions of the input pixels of the input image, and accordingly to constraint the enhancement level, thereby avoiding unexpected or unnatural skin/gradient color.

10. The system of claim 7, wherein the side-effect reduction unit comprises a dark saturated region preprocess subunit configured to remove noise and color variation of the input pixels of the input image using local smooth preprocessing.

11. The system of claim 7, wherein the side-effect reduction unit comprises an over-exposure prevention subunit configured to eliminate over-exposure in a high-intensity region of the result of the HVS-based LD histogram unit, wherein a high-intensity threshold is determined adaptively according to high-intensity distribution of the input image, and if the intensity value is smaller than the threshold, HE performed by the HE unit is applied; otherwise, direct mapping from an input intensity to an output intensity is used.

12. The system of claim 1, further comprising saturation enhancement performed after contrast enhancement performed by the HVS-based LD histogram unit, the histogram classifier and the HE unit to compensate for visual saturation drop that occurs when pixel luminance changes in the HSL color space.

13. The system of claim 12, wherein a circular region in a hue plane of HSL color space is applied to perform the saturation enhancement.

* * * * *